April 28, 1931. L. G. PACENT 1,803,040
VOLTAGE SUPPLY AND POWER AMPLIFIER UNIT
Filed Nov. 15, 1926 3 Sheets-Sheet 1
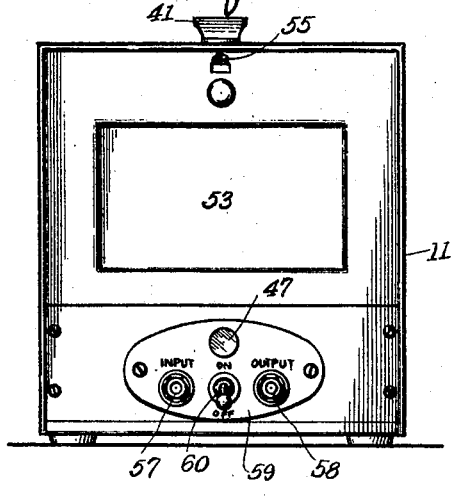
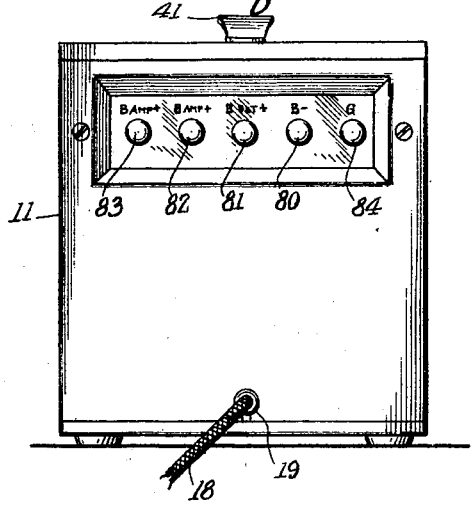
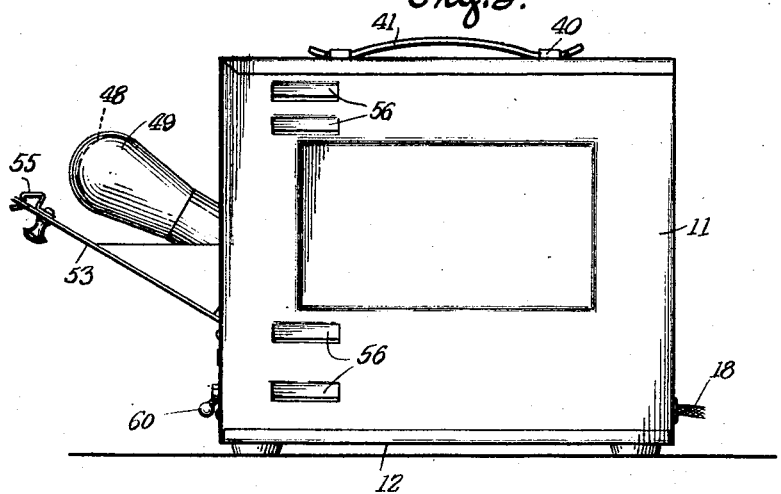
INVENTOR
Louis G. Pacent
BY
Philip S. McLean.
ATTORNEY April 28, 1931.  L. G. PACENT  1,803,040
VOLTAGE SUPPLY AND POWER AMPLIFIER UNIT
Filed Nov. 15, 1926   3 Sheets-Sheet 2

INVENTOR
Louis G. Pacent
BY
Philip S. McLean.
ATTORNEY

April 28, 1931.  L. G. PACENT  1,803,040
VOLTAGE SUPPLY AND POWER AMPLIFIER UNIT
Filed Nov. 15, 1926   3 Sheets-Sheet 3
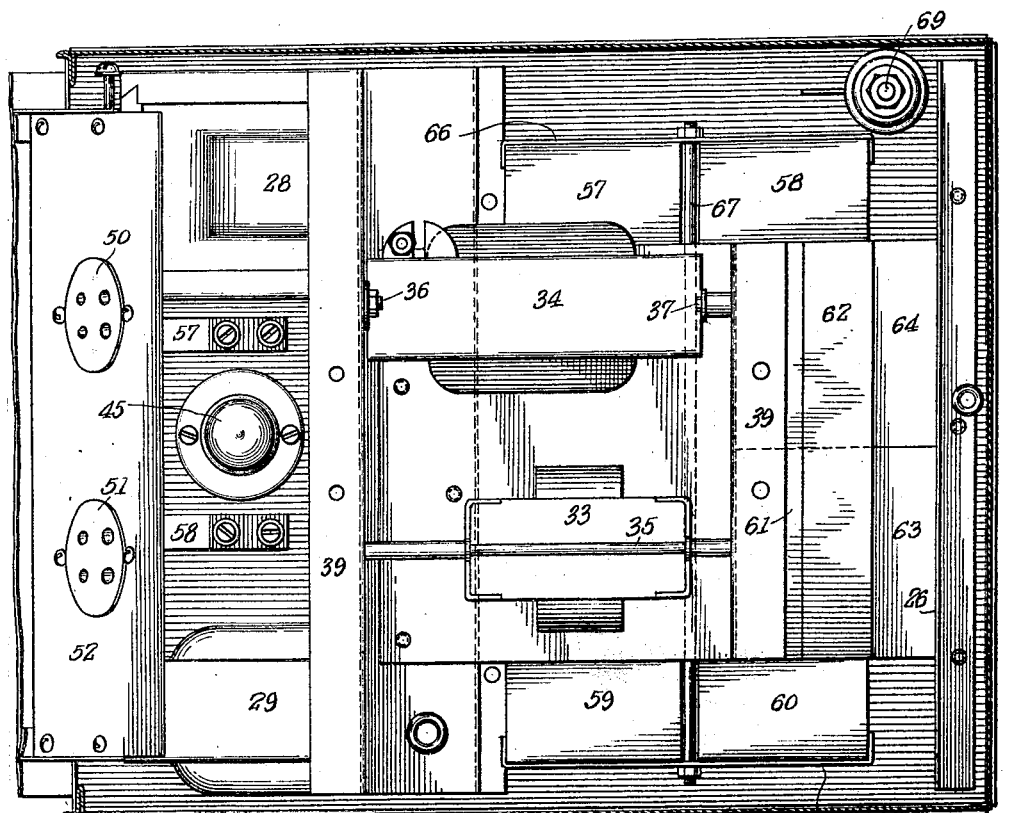
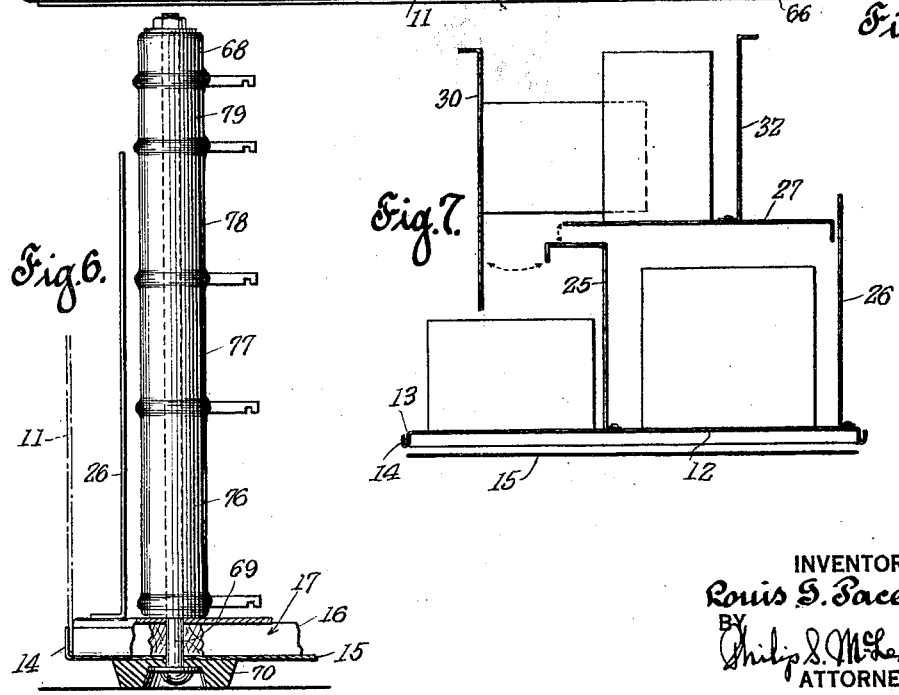
INVENTOR
Louis G. Pacent
BY
Philip S. McLean
ATTORNEY Patented Apr. 28, 1931

1,803,040

UNITED STATES PATENT OFFICE

LOUIS G. PACENT, OF WINFIELD, NEW YORK, ASSIGNOR TO PACENT ELECTRIC COMPANY, INC., OF NEW YORK, N. Y., A CORPORATION OF NEW YORK

VOLTAGE SUPPLY AND POWER AMPLIFIER UNIT

Application filed November 15, 1926. Serial No. 148,332.

The general objects of this invention are to provide a power unit operable directly from the usual alternating current house lighting circuit to provide both a dependable supply for the plate voltage of a radio receiving set and a power amplifier for the final stage of the set.

Further special objects are to provide a power unit of this character which will smooth out and eliminate the A. C. effect, will enable the receiving set to function at best efficiency and finally, will amplify the output of the set to the full volume desired without distorting or impairing the quality of reproduction.

Other important objects of the invention are to provide this power device in the form of a neat, attractive, relatively small, easily portable and compactly arranged unit, inexpensive enough to meet market requirements, practical in its construction and assembly, simple to connect in service, requiring no attention in operation and efficient in every way.

The foregoing and other desirable objects are attained in this invention by certain novel circuit arrangements and as well by certain novel features of construction, combinations and relations of parts as set forth in the following specification.

The drawings accompanying and forming part of the specification illustrate one approved circuit combination and one of the practical commercial embodiments of the invention but inasmuch as this illustration is primarily for purposes of disclosure, it will be understood that features of the circuit and the physical embodiment of the structure may be varied without departure from the true spirit and broad scope of the invention.

Figures 1 and 2 are front and rear views respectively of the unit illustrating particularly the through connections and single control at the front and the external conections at the back.

Figure 3 is a side view of the unit, showing the front panel hinged outwardly to expose the rectifying and amplifying tubes mounted on the shelf at the back of the same.

Figure 5 is a part sectional and horizontal plan view as on substantially the plane of line 5—5 of Figure 4.

Figure 6 is a detached and part sectional view of the resistance unit showing the special method and arrangement of mounting the same.

Figure 7 is a somewhat diagrammatic view illustrating the manner of assembling and shielding the various parts.

Figure 4:
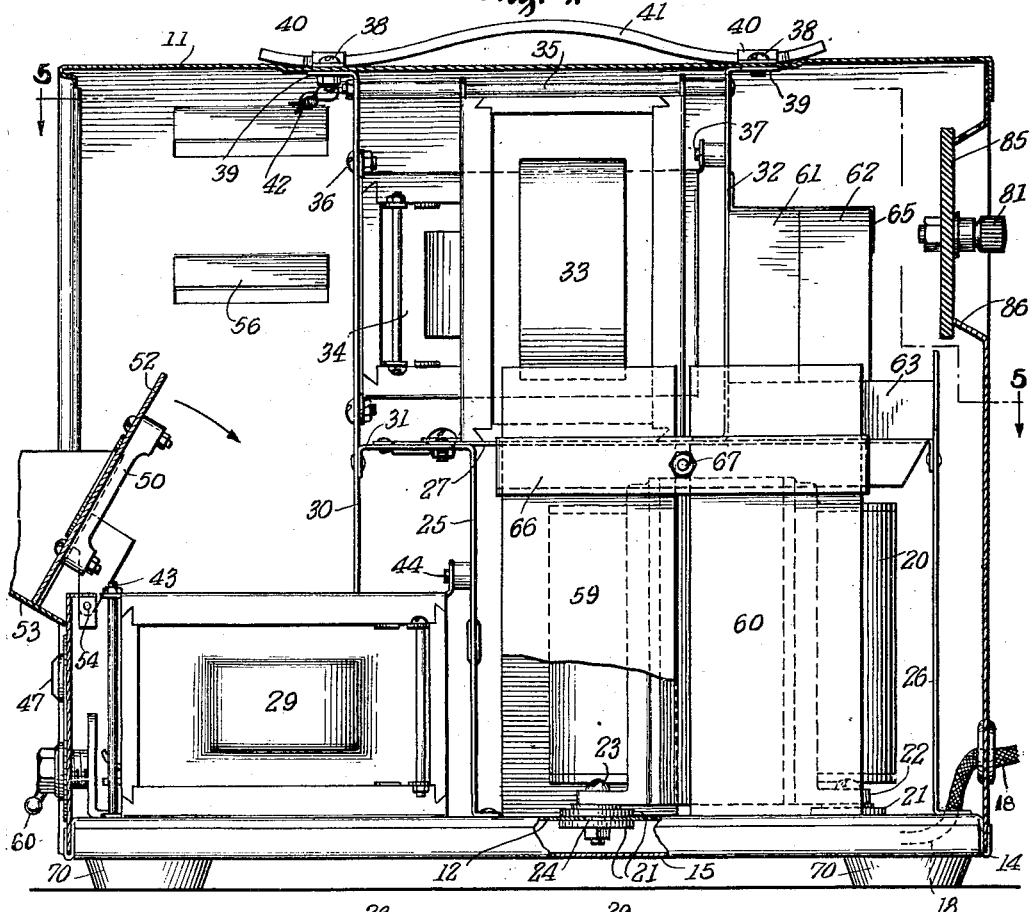
Figure 4 is a vertical sectional view of the unit on a larger scale to better illustrate details of construction.

One special feature of the invention is that all the parts which go to make up the unit are housed in a single metallic casing which in itself acts as a shield and that the devices of the several related circuits are individually shielded so that there is no undesirable radiation or coupling.

The case is shown as made up with integrally connected top 10 and sides 11, the latter having their lower edges entered in a grooveway 12 provided by the downwardly and upwardly bent lips 13 formed about the edges of the bottom plate 14, Figures 5 and 6. The bottom is of double construction, made with a closure plate 15 fitting within the dependent rim of plate 12 and spaced therefrom by the wooden spacer strips 16 to form the completely shielded chamber 17 for the power circuit connections, shown as a flexible cord 18 entered at the back of the casing at 19.

Immediately above the bottom compartment and located toward the rear of the case is a power transformer 20 taking current directly from the line and transforming it to the voltages suitable for the present purposes. To prevent any vibrations being set up by this transformer it is shown mounted on rubber or other vibration damping washers 21, the same being arranged in pairs beneath the feet 22 of the transformer, one above and the other below the bottom plate 12, with the securing screws 23 passing through all, the holes 24 in the bottom plate for these screws being large enough to prevent metal to metal contact, Figure 4.

The power transformer is shielded at the front and back by upright walls 25, 26 attached to the bottom plate 12 and at the top by a plate 27 secured to said upright walls.

In front of the primary transformer chamber is a shielding compartment for the two audio-frequency input and output transformers 28, 29, provided in part by the upright wall 25 and a second forwardly offset upright wall 30 attached to the forwardly extended portion 31 of the horizontal partion 27. The last mentioned upright wall 30 in cooperation with a wall 32 positioned to the rear and rising from the horizontal partition 27 forms a shielding chamber for the choke coils 33, 34, it being understood that in each instance the side walls of the casing itself cooperate to a certain extent to complete these shielding chambers.

The choke coils are shown mounted; the first, in an upright position, and the other in horizontal position to avoid objectionable coupling effects and they are shown secured in these relations, the coil 33 by a through bolt 35 extending between partitions 30, 32 and thus forming a tie rod and coil 34 by fastenings 36, 37, securing it at its opposite ends to the same partitions. This method of fastening the choke coils in place thus serves to rigidly brace the upright partitions, enabling the same through their intermediate connections with the base plate to carry the full weight of the entire apparatus. This manner of unifying and tying the parts together will be understood from the diagrammatic picturization of the same in Figure 7. The shielding partitions may be made of light sheet iron having flanged-over ends affording angles for riveting or otherwise suitably connecting them together.

The partitions thus constitute in effect a relatively rigid frame and to this frame the shell of the case is attached as shown in Figures 4 and 5 by screws 38 which extend down through the top of the case and through the overturned flanges 39 at the upper edges of the upright partitions 30, 32. These screws serve the further purposes of fastening the loops 40 for the carrying strap 41 and of providing a seal for the case, Figure 4, showing how a piece of wire 42 is sealed to the inner end of one of these screws inside the front compartment of the case. In this simple, inexpensive way the case may be sealed after the parts of the unit have been properly mounted and connected.

Figure 8:
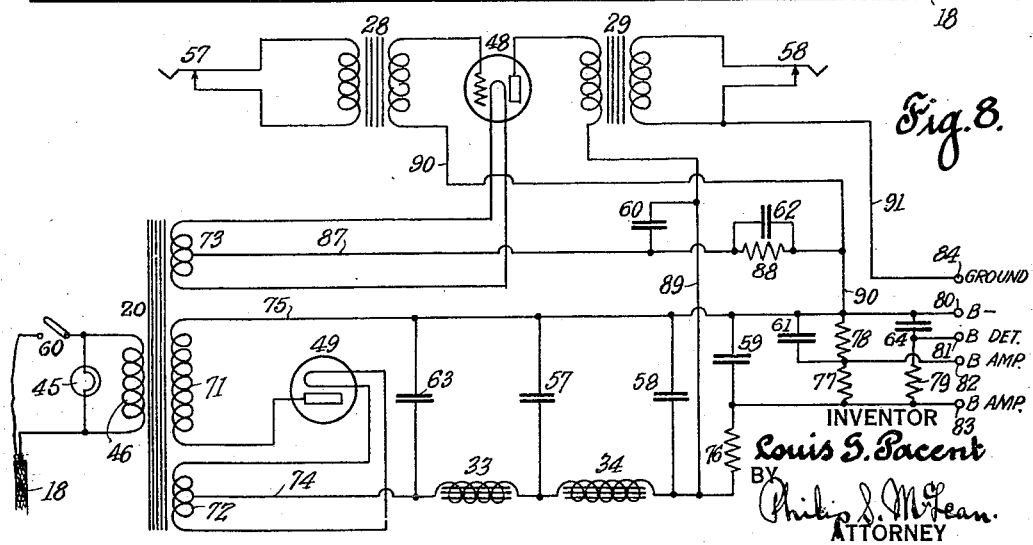
Figure 8 is a diagram of the wiring of the particular unit illustrated.

The audio-frequency transformers 28, 29 are shown in Figures 4 and 5 in the lower portion of the front compartment, spaced widely apart and secured in the opposite side portions of said compartment by tie rods 43 fastening the same to the bottom and by screws 44 fastening them at the rear to the upright partition 25. These transformers are shown turned at right angles to each other and spaced to avoid interference. This spacing also as shown in Figure 5 provides room for a pilot light 45 in the bottom of the front compartment between the audio-transformers. This light, as shown in the wiring diagram, Figure 8, is connected across the primary 46 of the power transformer and shows through a ruby glass 47 or the like in the front panel of the instrument to indicate when the unit is connected in the power circuit.

The space in the front compartment above the audio-transformers and pilot is utilized as a chamber for the power amplifying and rectifying tubes 48, 49. These tubes are supported in socket 50, 51, mounted on a shelf 52 carried by the swinging front panel 53 hingedly supported on suitable pivots 54. This hinging front panel is shown as releasably secured at the top by a spring catch 55. Louvers 56 are shown provided in the sides of the tube chamber for ventilation purposes.

In the bottom of the front compartment, between the transformers and at opposite sides of the pilot are mounted the input and output jacks 57, 58, said jacks being shown in Figures 1 and 4, as exposed at the front through an ornamental panel 59 which carries the indicator glass 47 and also the centrally disposed control switch 60 which, as indicated in the wiring diagram, is cut in on one side of the connections to the primary of the power transformer.

The choke coils 33, 34 form the inductances in a filter section which includes a number of condensers. These condensers are so located as to assist in the shielding action. Thus, as shown in Figures 4 and 5, the larger condensers 57—58 and 59—60 are arranged in pairs at opposite sides of the power transformer and a pair of the next size condensers 61, 62 are mounted side by side in back of partition 32 and on top of a pair of smaller condensers 63, 64, supported on horizontal partition 27. A strap 65 retains the last group of condensers in place and bracket strips 66 caught together by a stay bolt 67, Figure 5, and having angled ends caught about the corners of the blocks hold the paired condensers in place at the opposite sides of the power transformer.

To gain desired reductions in voltage, a sectional resistance unit is indicated at 68 fastened upright in the corner of the rear compartment by a bolt 69 extending up through the bottom of the case. This bolt is shown in Figure 6 as extending up through one of the cushion feet 70 of the case and through the wooden spacer strip 16 in the double bottom so as to also hold these parts in place.

With the several parts described connected in the circuit relations shown in Figure 8, it will be seen that when connected with the usual alternating current house lighting system, the apparatus will function to supply constant potential to the plate circuits of a radio receiving set and to supply the entire energy for a single stage of audio-frequency power amplification.

For the accomplishment of these results the power transformer is of special design, having in addition to the main secondary winding 71 for supplying the plate voltage on the rectifying tube 49, two supplemental secondary windings 72, 73, the first for supplying the filament voltage to the rectifying tube and the other for heating the filament of the amplifier tube 48. A center connection 74 is taken off from the supplemental secondary 72 to form the positive side of the direct current output. The negative side of the direct current output is provided by a connection 75 from one end of the main secondary 71, the opposite end of said secondary being connected with the plate in the rectifying tube 49.

The filter is shown made up of the inductances 33, 34 connected in series in the positive side of the output and the condensers 63, 57, 58, 59, connected across the line both before and after the inductances.

Suitable reductions in voltage are obtained by the resistance sections 76, 77, 78, 79 and the direct current energy is taken off at appropriately designated binding posts or terminals shown at 80, 81, 82, 83, marked for instance in the order named: B—, B detector, B amplifier 90 volts and B amplifier 130 volts. These terminals, as well as a "ground" binding post 84 are all shown mounted on an insulating base 85 supported in an inset frame or opening 86 in the back of the case.

By a central connection 87 from the other auxiliary secondary 73 connected with the negative side of the line, through a resistance 88 and a connection 89 from the positive side of the line, the plate potential for the amplifying tube 48 is obtained. The condenser 60 is shown connected across the two sides of this line and a by-pass condenser 62 is shown shunted about the resistance 88 in the negative side of the line.

The primary of the input transformer is shown connected directly with the input jack 57 and the secondary of this transformer is connected at one end with the grid of the power amplifier tube and at the other end with the center connection 87 and negative side of the direct current output by wiring 90. The power of the amplifying tube, instead of being passed direct to the output jack 58, is passed from the plate of the tube through the primary of the output transformer, the secondary of this transformer being connected with the output jack and by connection 91 with the ground terminal. The metallic case of the unit is grounded at one point only, as indicated at 92 so that there will be no current flow through the walls of the case and hence no disturbing effects from such a source.

From the foregoing it will be seen that the invention combines for the first time in a single unit, a rectifier, a filter and a power amplifier energized entirely from the unit. The input transformer may be of the usual audio-frequency amplifier type and the output transformer may, for instance, have a one to one ratio or have any other ratio for matching the two impedances to the loud speaker impedance. This output transformer serves to prevent the plate potential of the amplifier tube being applied to the output terminals and also to keep the direct current components of the plate current from flowing through the output circuit, outside the unit.

As the primary of the output transformer is connected at one side to the plate of the amplifier tube and at the other end to the positive side of the output of the filter and as the center tap on the amplifier filament winding is connected to the negative side of the rectified current line, plate current flows from the terminal of the transformer which is positive, by way of the plate to the filament and through the filament supply winding of the power transformer to the negative side of the line. The purpose of the resistance 88 in this side of the line is to make the filament positive with respect to the negative terminal. The grid of the amplifier tube being connected to one end of the secondary of the input transformer and the other end of said secondary being connected with the negative side of the rectified current supply brings the filament potential to a point intermediate between the plate and grid potentials of the amplifier tube. This potential may be regulated by the proper choice of resistance. Thus, it being known that the tube amplifies satisfactorily when the grid is a certain voltage negative to the filament, the resistance used is such that the voltage produced by the flow of plate current equals that at which the tube best operates. Low impedance paths for the A. C. components of the plate filament and grid filament circuits of the amplifier are provided by the condensers 62 and 60, the latter being connected between the center tap of the filament winding 73 and that end of the output transformer primary which is connected to the positive side of the filtered direct current line.

It will be obvious that the unit may be constructed to operate as a full wave rectifier as well as a half wave rectifier, by the use of another rectifier tube or by employing a double cathode tube with the necessary connections. It will be apparent to those skilled in the art that various other changes may be made within the scope of the invention and for this reason it should be understood that the terms employed herein are used in a descriptive rather than in a limiting sense; except for such limitations as may be required by the state of the prior art.

The parts of the unit are compactly arranged but the several circuits are so separated and the shielding is so complete that there is no undesirable coupling or radiation. The tubes are readily accessible at the front of the device and the connections with the supply circuit and with the radio set and speaker are simple and easily understood The unit requires only the one control, that is, the on and off switch, leaving the tuning and the volume to be controlled entirely in the usual way by the controls on the receiving set. The pilot serves as a constant signal showing at a glance whether the power unit is in service or off. The ready portability and small size of the unit make it practical to carry the unit about and to locate it wherever most convenient, either near the receiving set or at some more or less remote point.

The combining of both the power amplifier and the plate potential source in one small unit is another important practical advantage, enabling the conversion of any ordinary receiving set to power amplifier operation and at the same time supplying the tubes of the receiver with the steady high power voltage so necessary for successful power amplification operation. If so desired, only the plate potential of the unit may be utilized. In such case the output is taken direct from the receiving set to the speaker instead of passing it through the power amplifier section of the apparatus and the device then functions only to furnish the plate potential to the tubes of the receiving set.

What is claimed is:

1. A power supply unit comprising a case having an outwardly movable front panel and a relatively stationary panel below the same, a tube socket on the back of said upper movable panel and input and output connecting means and a control switch at said lower relatively fixed panel.

2. In a power unit, a power transformer, a rectifier deriving its energy from said transformer, a filter for the rectified current, including condensers and means for securing said condensers in shielding relation about said transformer.

3. A power amplifier and B-battery substitute power supply unit for use with radio receiving sets and comprising in a single unit transportable as such, a shielding metallic case, a shielding compartment within the lower portion of said case, a power transformer in said shielding compartment and having connections external to the case for connecting the unit with an alternating current supply line, an audio-frequency input transformer in the case in shielded relation to the power transformer and having input terminals accessible externally of the case by which the output of a radio receiving set may be connected into the amplifying system of the unit, an audio-frequency power amplifier tube within the case and energized from the power transformer, said power amplifier tube being connected at its input side with the secondary of the input transformer, an output audio frequency transformer having its primary connected with the output side of the power amplifier tube and having its secondary supplied with output terminals accessible externally of the case for connection with a loud speaker or the like, a rectifier tube within the case and energized from the power transformer, terminals accessible outside the case for connection with the B-battery circuits of the receiving set with which the unit is used and connections within the case from the rectifying tube to the said B-supply terminals.

4. A portable power unit for use with radio receiving sets comprising a shielding metallic casing, a power transformer mounted on the bottom of said casing and provided with connections externally of the casing for coupling the same to an alternating current supply source, vertically and horizontally arranged metallic partitions within the casing forming a shield about the power transformer, input and output audiofrequency transformers in the casing forward of the vertical partition, a power amplifying tube and a rectifying tube in the casing forward of the vertical partition and above the audio-frequency transformers, connections from the power transformer to said power amplifier and rectifying tubes, a direct current power output line from the rectifying tube and including condensers mounted behind the partition in back of said tube and above the horizontal partition over the power transformer and terminals for said power output line at the back of the casing in rear of said condensers.

In witness whereof, I have hereunto set my hand this 22nd day of October, 1926.

LOUIS G. PACENT.